(12) United States Patent
Uchida et al.

(10) Patent No.: US 12,344,371 B2
(45) Date of Patent: Jul. 1, 2025

(54) THRUST GENERATING DEVICE

(71) Applicant: HONDA MOTOR CO., LTD., Tokyo (JP)

(72) Inventors: Kenta Uchida, Wako (JP); Toshinori Tsukamoto, Wako (JP); Masashi Kato, Wako (JP); Bon Aizawa, Wako (JP); Kaisaku Yoshimura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/463,013

(22) Filed: Sep. 7, 2023

(65) Prior Publication Data

US 2024/0083574 A1    Mar. 14, 2024

(30) Foreign Application Priority Data

Sep. 9, 2022  (JP) ................................. 2022-143525

(51) Int. Cl.
| | | |
|---|---|---|
| *B64C 27/78* | (2006.01) | |
| *B64C 27/12* | (2006.01) | |
| *B64C 27/54* | (2006.01) | |
| *B64C 29/00* | (2006.01) | |
| *B64D 27/24* | (2024.01) | |
| *B64D 31/00* | (2024.01) | |
| *B64D 45/00* | (2006.01) | |

(52) U.S. Cl.
CPC ............... *B64C 27/78* (2013.01); *B64D 45/00* (2013.01); *B64C 29/0008* (2013.01)

(58) Field of Classification Search
CPC ................................. B64D 31/06; B64D 27/10; B64D 2033/0293; B64D 31/00; B64D 2045/0085; B64D 35/00; B64D 45/00; B64D 27/24; B64C 11/305; B64C 11/303; B64C 2027/8236; B64C 27/10; B64C 27/14; B64C 11/30; B64C 11/301; B64C 11/34; B64C 11/40; B64C 11/44; B64C 11/48; B64C 11/38; B64C 13/04; B64C 13/18; B64C 13/503; B64C 27/12; B64C 27/22; B64C 27/78; B64C 27/54; B64C 29/0008; B64C 29/00; B64U 30/20; B64U 50/19; F05D 2220/325; F05D 2220/32; F05D 2260/70; F05D 2270/304; F05D 2220/323; F05D 2270/70; F05D 2270/05; F05D 2270/051; F05D 2270/20; F05D 2270/54; F02C 9/00; F02C 9/28; F02C 9/44; F02C 9/32; F02C 9/58; F01D 5/02; F04D 27/004

See application file for complete search history.

(56) References Cited

U.S. PATENT DOCUMENTS

| | | | |
|---|---|---|---|
| 10,336,436 B2 | 7/2019 | Siu et al. | |
| 10,926,874 B2* | 2/2021 | Giannini | ................... B64C 5/16 |
| 11,225,323 B2* | 1/2022 | Stanney | ................... B64C 27/82 |
| 2020/0023963 A1* | 1/2020 | James | ................... B64D 27/357 |

(Continued)

*Primary Examiner* — Eric J Zamora Alvarez
(74) *Attorney, Agent, or Firm* — Rankin, Hill & Clark LLP

(57) ABSTRACT

A controller of a thrust generating device executes one of first control of controlling thrust by changing the pitch angle of each blade while maintaining the rotational speed of a propeller at a reference value, or second control of allowing the thrust greater than the thrust generated in the first control to be generated by making the rotational speed of the propeller larger than the reference value.

5 Claims, 7 Drawing Sheets

(56) References Cited

U.S. PATENT DOCUMENTS

| | | | |
|---|---|---|---|
| 2021/0047029 A1* | 2/2021 | Stanney | B64C 29/0033 |
| 2021/0316874 A1* | 10/2021 | Resnick | B60L 58/12 |
| 2023/0021800 A1* | 1/2023 | Britchford | B64D 27/355 |
| 2023/0182916 A1* | 6/2023 | Resnick | B60L 58/12 |
| 2024/0375766 A1* | 11/2024 | Freer | B64D 27/10 |

* cited by examiner

THRUST GENERATING DEVICE

CROSS-REFERENCE TO RELATED APPLICATIONS

This application is based upon and claims the benefit of priority from Japanese Patent Application No. 2022-143525 filed on Sep. 9, 2022, the contents of which are incorporated herein by reference.

BACKGROUND OF THE INVENTION

Field of the Invention

The present invention relates to a thrust generating device that generates thrust in a vertical direction.

Description of the Related Art

U.S. Ser. No. 10/336,436 B2 discloses a rotorcraft. In this rotorcraft, a controller (processor) causes a desired thrust to be generated by controlling the pitch angle of each blade of a propeller while keeping the rotational speed of the propeller constant.

SUMMARY OF THE INVENTION

According to the rotorcraft disclosed in U.S. Ser. No. 10/336,436 B2, noise can be reduced by maintaining the rotational speed of the propeller at a low level. However, when the propeller is maintained at a low rotational speed, the upper limit value of the thrust is reduced, and thus there is a case where the required thrust cannot be obtained. By increasing the size of the propeller itself, the upper limit value of the thrust is increased. However, since a large propeller is heavy, the weight of the rotorcraft increases.

An object of the present invention is to solve the above-mentioned problem.

According to an aspect of the present invention, there is provided a thrust generating device comprising: a propeller including one or a plurality of blades and configured to generate thrust in a vertical direction for an aircraft; a motor configured to rotate the propeller; an actuator configured to change a pitch angle of each of the blades; and a controller configured to control a rotational speed of the propeller by controlling the motor, and to control the pitch angle of each of the blades by controlling the actuator, wherein the controller executes one of first control of controlling the thrust by changing the pitch angle of each of the blades while maintaining the rotational speed of the propeller at a reference value, or second control of allowing the thrust greater than the thrust generated in the first control to be generated by making the rotational speed of the propeller larger than the reference value.

According to the present invention, it is possible to reduce the occurrence of noise and obtain required thrust.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

1. Configuration of Thrust Generating Device 10

Figure 1:
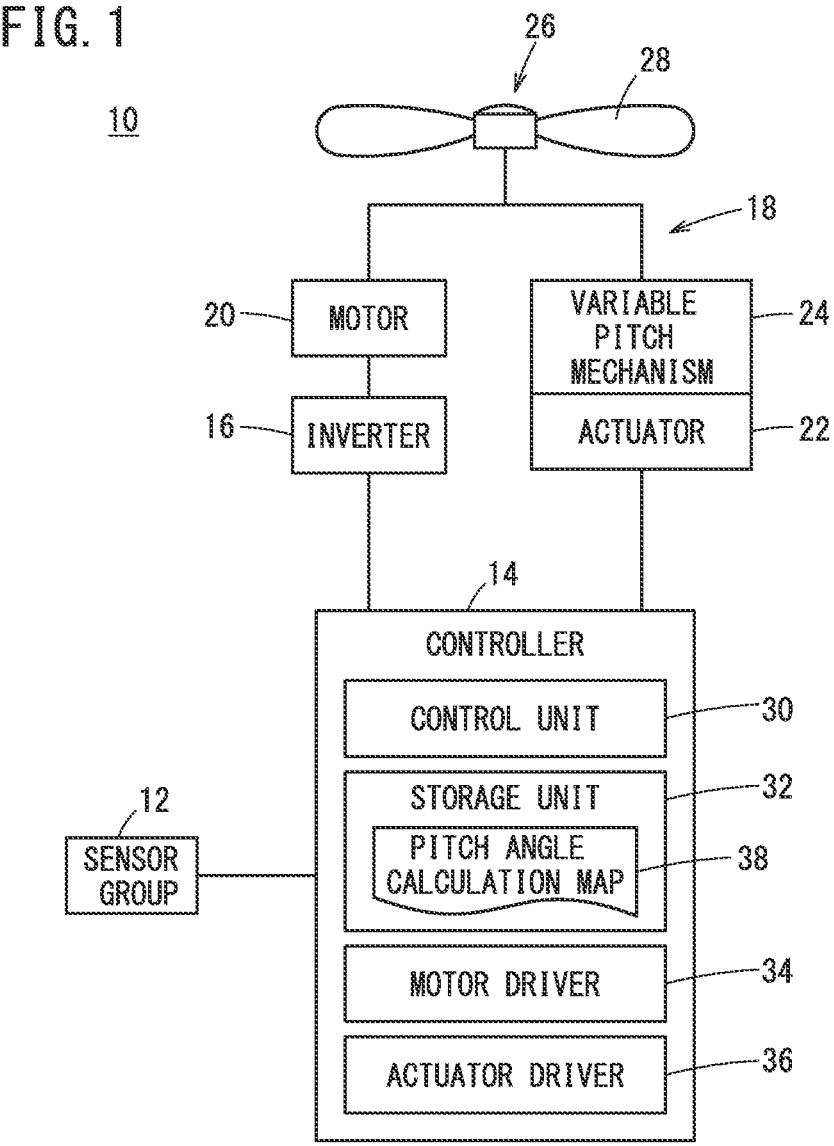
FIG. 1 is a configuration diagram of a thrust generating device.

FIG. 1 is a configuration diagram of a thrust generating device 10. The thrust generating device 10 is provided in a VTOL aircraft. The VTOL aircraft includes a plurality of VTOL rotors 18 and a plurality of cruise rotors. Each VTOL rotor 18 generates thrust in the vertical direction. Each cruise rotor generates thrust in the horizontal direction. The thrust generating device 10 controls the thrust of the VTOL rotors 18. In the present embodiment, the thrust generating device 10 is provided in an electric vertical take-off and landing aircraft, a so-called eVTOL aircraft. However, the thrust generating device 10 may be provided in a VTOL aircraft other than the electric VTOL aircraft. Further, the thrust generating device 10 may be provided in a VTOL aircraft including a tilt-rotor instead of the VTOL rotor 18 (and the cruise rotor).

The thrust generating device 10 includes a sensor group 12, a controller 14, an inverter 16, and the VTOL rotor 18. The VTOL rotor 18 includes a motor 20, an actuator 22, a variable pitch mechanism 24, and a propeller 26. The propeller 26 includes one or a plurality of blades 28.

The sensor group 12 includes a plurality of sensors for detecting the behavior of the eVTOL aircraft. For example, the sensor group 12 includes a plurality of angular velocity sensors, a plurality of acceleration sensors, and a speed sensor. Some of the angular velocity sensors and the acceleration sensors detect angular velocities and angular accelerations around the yaw axis of the eVTOL aircraft. Some of the angular velocity sensors and the acceleration sensors detect angular velocities and angular accelerations around the roll axis of the eVTOL aircraft. Some of the angular velocity sensors and the acceleration sensors detect angular velocities and angular accelerations around the pitch axis of the eVTOL aircraft. The speed sensor detects an airspeed.

The controller 14 controls the motor 20 and the actuator 22. The controller 14 may be a flight controller of the eVTOL aircraft. Alternatively, the controller 14 may be a slave controller managed by the flight controller. Alternatively, the controller 14 may include both the flight controller and the slave controller. The controller 14 includes a control unit 30, a storage unit 32, a motor driver 34, and an actuator driver 36.

The control unit 30 includes processing circuitry. The processing circuitry may be a processor such as a CPU or a GPU. The processing circuitry may be an integrated circuit such as an ASIC or an FPGA. The processor can execute various processes by executing a program stored in the storage unit 32. At least some of the plurality of processes may be executed by an electronic circuit including a discrete device.

The storage unit 32 includes a volatile memory and a non-volatile memory. Examples of the volatile memory include a RAM and the like. The volatile memory is used as a working memory of the processor. The volatile memory temporarily stores data and the like necessary for processing or computation. Examples of the non-volatile memory include a ROM, a flash memory, and the like. The non-volatile memory is used as a storage memory. The non-volatile memory stores programs, tables, maps, and the like. At least a part of the storage unit 32 may be included in the processor, the integrated circuit, or the like described above.

The non-volatile memory stores a reference value of the rotational speed of each propeller 26. The reference value is a rotational speed of the propeller 26 that is maintained in first control described later. The reference value is set based on the viewpoint of reducing noise generated by the rotation of the propeller 26 and the viewpoint of generating necessary thrust. In addition, the non-volatile memory stores a pitch angle calculation map 38. The pitch angle calculation map 38 will be described in [2-2] below.

The motor driver 34 outputs an ON/OFF signal to each switching element of the inverter 16 in accordance with a motor control signal output from the control unit 30. The actuator driver 36 supplies electric power to the actuator 22 in response to an actuator control signal output from the control unit 30.

The inverter 16 includes an inverter circuit. The inverter circuit includes a plurality of switching elements. A primary terminal of the inverter circuit is connected to a power source (not shown). A secondary terminal of the inverter circuit is connected to the motor 20. The inverter circuit can convert DC power output from the power source into AC power, and output the AC power to the motor 20.

The motor 20 is, for example, a three-phase motor. A rotation shaft of the motor 20 is connected to a hub of the propeller 26. The motor 20 rotates the propeller 26. The actuator 22 operates the variable pitch mechanism 24 to change the pitch angle of each blade 28.

2. First Embodiment

[2-1. Function of Control Unit 30]

Figure 2:
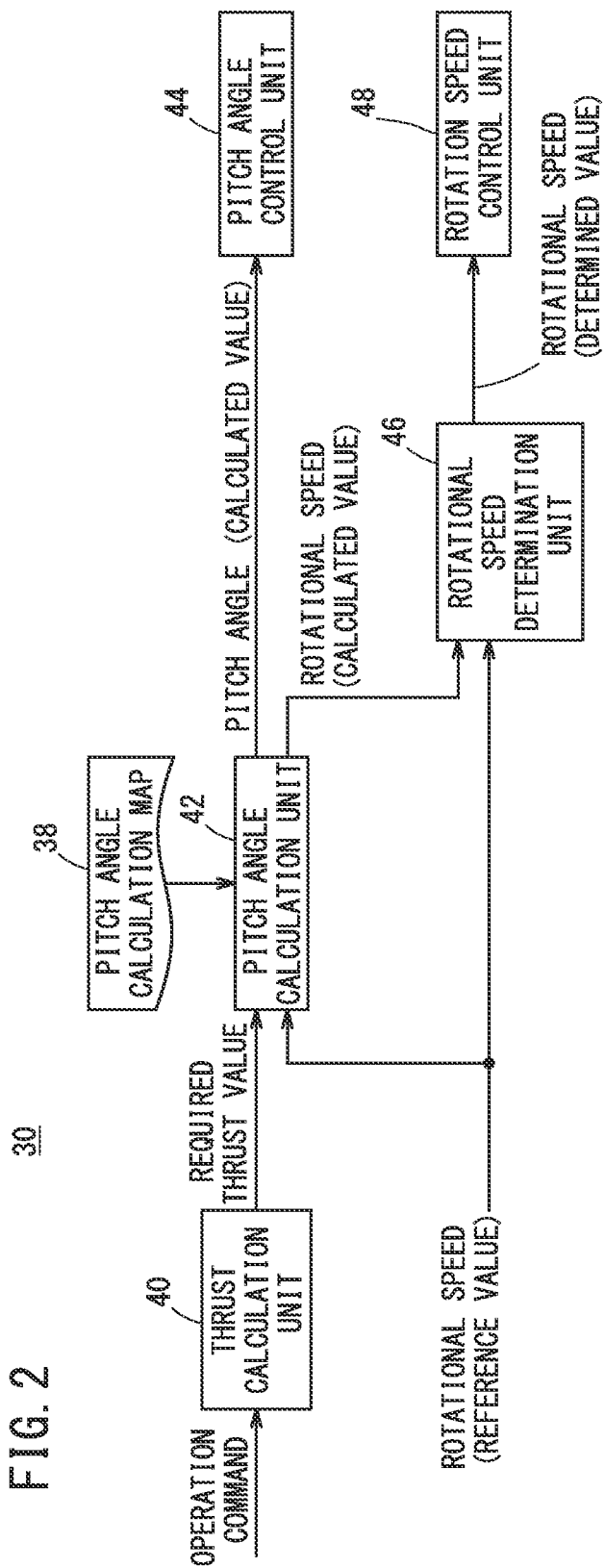
FIG. 2 is a functional block diagram of a control unit in a first embodiment.

FIG. 2 is a functional block diagram of the control unit 30 in a first embodiment. The control unit 30 can execute one of first control or second control as thrust control. In addition, the control unit 30 can appropriately perform switching from the first control to the second control and switching from the second control to the first control. In the first control, the control unit 30 controls the thrust by changing the pitch angle of each blade 28 while maintaining the rotational speed of the propeller 26 at the reference value. In the second control, by making the rotational speed of the propeller 26 larger than the reference value, the control unit 30 generates greater thrust than the thrust generated in the first control. The control unit 30 executes the first control as much as possible, and switches from the first control to the second control only when the necessary thrust cannot be obtained in the first control. It should be noted that the term "thrust" used in this specification means thrust in the vertical direction unless otherwise specified.

The control unit 30 has a function of executing the first control and the second control as the thrust control. As an example, the control unit 30 functions as a thrust calculation unit 40, a pitch angle calculation unit 42, a pitch angle control unit 44, a rotational speed determination unit 46, and a rotational speed control unit 48 by executing a program stored in the storage unit 32.

The thrust calculation unit 40 calculates necessary thrust in response to an operation command. The value of this thrust is referred to as a required thrust value. The operation command is output based on, for example, an operation of a control stick. Further, the operation command is output by an autopilot system or the like. The formula or map for calculating the thrust is stored in the storage unit 32.

The pitch angle calculation unit 42 acquires the required thrust value from the thrust calculation unit 40, and acquires the reference value of the rotational speed of the propeller 26 from the storage unit 32. The pitch angle calculation unit 42 calculates the pitch angle of the blade 28 and the rotational speed of the propeller 26 for obtaining the required thrust value. For example, the pitch angle calculation unit 42 uses the pitch angle calculation map 38 stored in the storage unit 32. The calculation of the pitch angle and the rotational speed will be described in [2-2] below.

The pitch angle control unit 44 acquires a calculated value of the pitch angle from the pitch angle calculation unit 42. The pitch angle control unit 44 outputs an actuator control signal to the actuator driver 36 in order to bring the pitch angle of the blade 28 close to the value calculated by the pitch angle calculation unit 42. For example, the pitch angle control unit 44 may perform feedback control using, as a target value, the value calculated by the pitch angle calculation unit 42.

The rotational speed determination unit 46 acquires a calculated value of the rotational speed from the pitch angle calculation unit 42, and acquires the reference value of the rotational speed of the propeller 26 from the storage unit 32. The rotational speed determination unit 46 determines the rotational speed of the propeller 26 based on the calculation result of the pitch angle calculation unit 42. When the rotational speed calculated by the pitch angle calculation unit 42 does not exceed the reference value, the rotational speed determination unit 46 sets the rotational speed of the propeller 26 to the reference value. Thus, the first control is executed. On the other hand, when the rotational speed calculated by the pitch angle calculation unit 42 exceeds the reference value, the rotational speed determination unit 46 sets the rotational speed of the propeller 26 to the value calculated by the pitch angle calculation unit 42. Thus, the second control is executed.

The rotational speed control unit 48 acquires the determined value of the rotational speed from the rotational speed determination unit 46. The rotational speed control unit 48 outputs a motor control signal to the motor driver 34 in order to bring the rotational speed of the propeller 26 close to the value determined by the rotational speed determination unit 46. For example, the rotational speed control unit 48 may perform feedback control using, as a target value, the value determined by the rotational speed determination unit 46.

[2-2. Calculation of Pitch Angle and Rotational Speed Using Pitch Angle Calculation Map 38]

Figure 3:
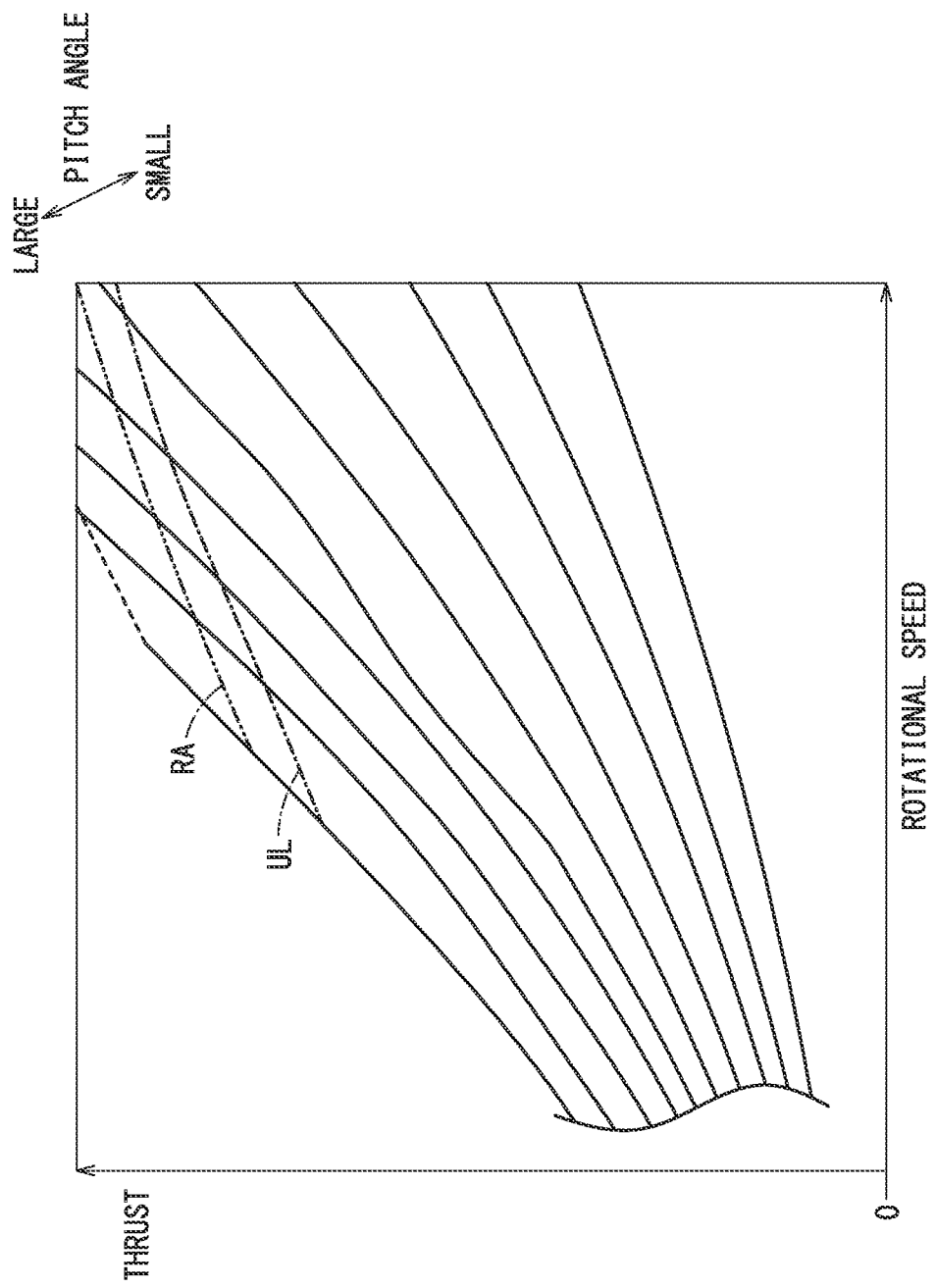
FIG. 3 is a diagram showing the relationship between the rotational speed of a propeller and the thrust of a VTOL rotor for each pitch angle.
Figure 4:
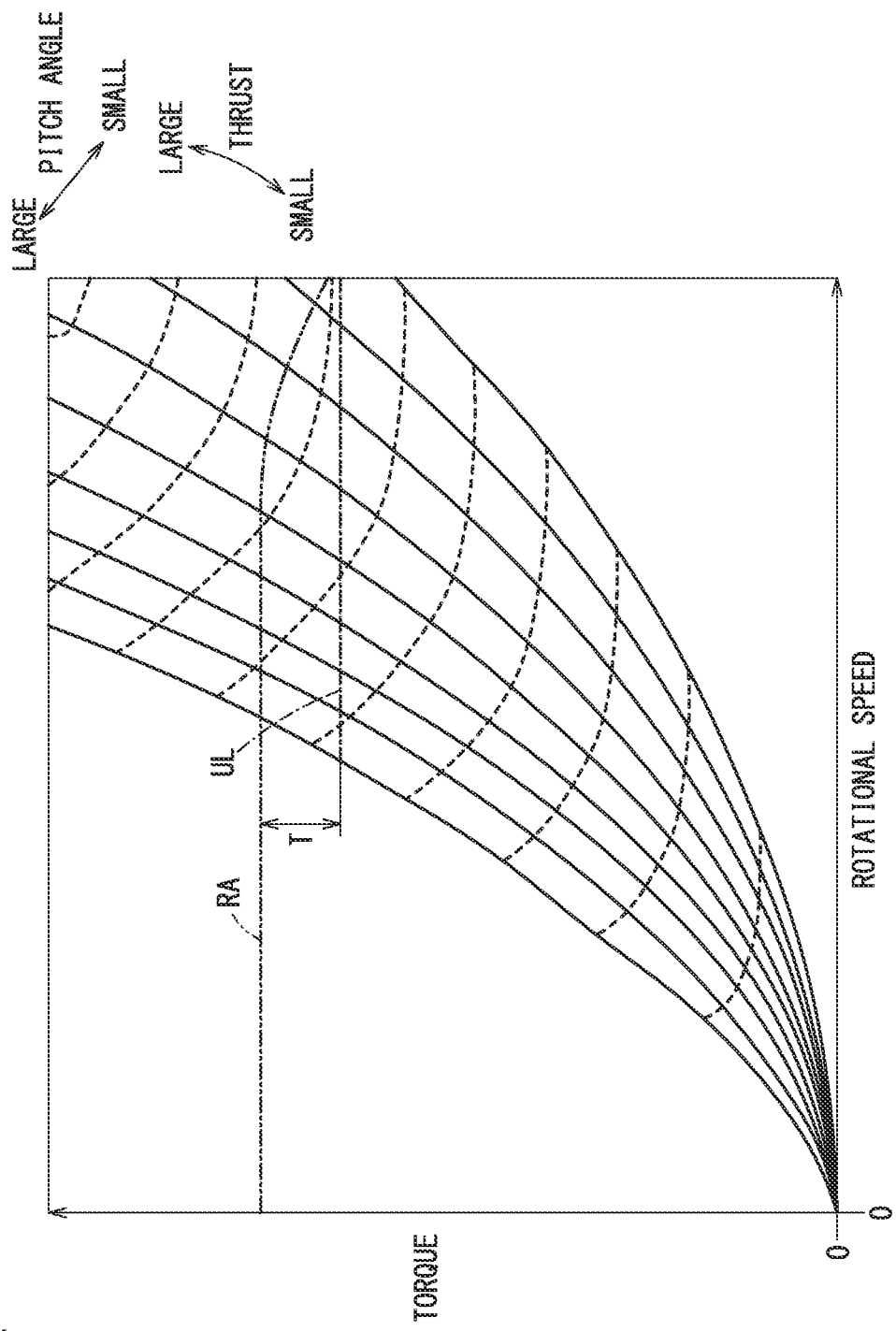
FIG. 4 is a diagram showing the relationship between the torque and the rotational speed of the propeller for each pitch angle, and showing the rated value of the torque of a motor.

FIG. 3 is a diagram showing the relationship between the rotational speed of the propeller 26 and the thrust of the VTOL rotor 18 for each pitch angle. In FIG. 3, a plurality of solid lines indicate the relationship between the rotational speed and the thrust at different pitch angles. FIG. 4 is a diagram showing the relationship between the torque and the rotational speed of the propeller 26 for each pitch angle, and showing the rated value of the torque of the motor 20. In FIG. 4, a plurality of solid lines indicate the relationship between the torque and the rotational speed at different pitch angles. Further, in FIG. 4, a plurality of broken lines indicate the relationship between the torque and the rotational speed at different thrusts. As shown in FIGS. 3 and 4, the thrust is correlated with the pitch angle of the blade 28 and the rotational speed of the propeller 26. Based on this correlation, the pitch angle calculation map 38 associates the thrust of the VTOL rotor 18, the pitch angle of the blade 28, and the rotational speed of the propeller 26.

Further, in the pitch angle calculation map 38, an upper limit value (UL) of the pitch angle is set for each rotational speed. In FIGS. 3 and 4, an alternate long and short dash line indicates the upper limit value (UL) of the pitch angle for each rotational speed. For example, as shown in FIG. 4, a pitch angle at which the torque of the motor 20 becomes smaller than a rated value (RA) is set as the upper limit value (UL). That is, a predetermined torque difference is set between the torque of the motor 20 corresponding to the upper limit value (UL), and the rated value (RA). This torque difference is referred to as a torque margin (T). An arbitrary value can be set as the upper limit value (UL). In FIG. 4, the upper limit value (UL) is a constant value. Alternatively, the upper limit value (UL) may be a variable value that varies depending on a change in the rotational speed. For example, in FIG. 4, the upper limit value (UL) may be a variable value that increases as the rotational speed increases. The torque margin (T) is set for the following reason. In order to increase the rotational speed of the propeller 26, a torque that overcomes the inertia is required. When the propeller 26 rotates in a state where the pitch angle exceeds the upper limit value (UL), the torque required to increase the rotational speed of the propeller 26 becomes insufficient. As a result, the responsiveness of the propeller 26 deteriorates. In the first embodiment, when the rotational speed of the propeller 26 needs to be increased, the torque margin (T) is set in order to prevent the responsiveness of the propeller 26 from deteriorating.

As described above, in the first embodiment, the reference value is set as the rotational speed of the propeller 26. Further, the required thrust value is calculated by the thrust calculation unit 40. The pitch angle calculation unit 42 calculates a pitch angle corresponding to the required thrust value and the reference value by using the pitch angle calculation map 38.

Figure 5:
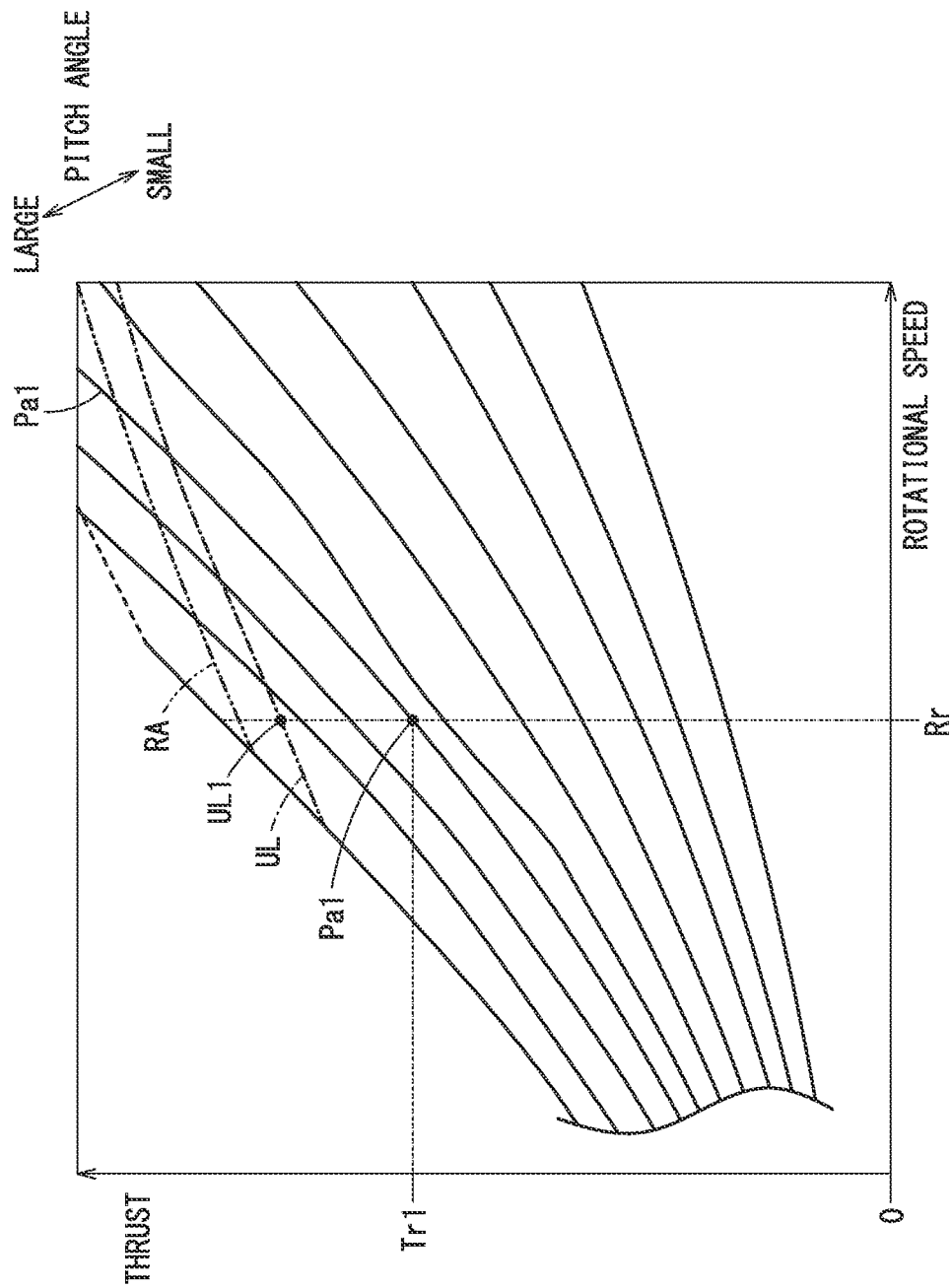
FIG. 5 is a diagram for explaining a method of calculating a pitch angle.

FIG. 5 is a diagram for explaining a method of calculating a pitch angle. FIG. 5 is also a diagram for explaining the first control. For example, it is assumed that the pitch angle calculation unit 42 acquires a required thrust value (Tr1) and a reference value (Rr). A pitch angle (Pa1) corresponds to the required thrust value (Tr1) and the reference value (Rr). The pitch angle (Pa1) is smaller than an upper limit value (UL1) corresponding to the reference value (Rr). In this case, the pitch angle calculation unit 42 uses the pitch angle calculation map 38 to calculate the pitch angle (Pa1) corresponding to the required thrust value (Tr1) and the reference value (Rr).

Figure 6:
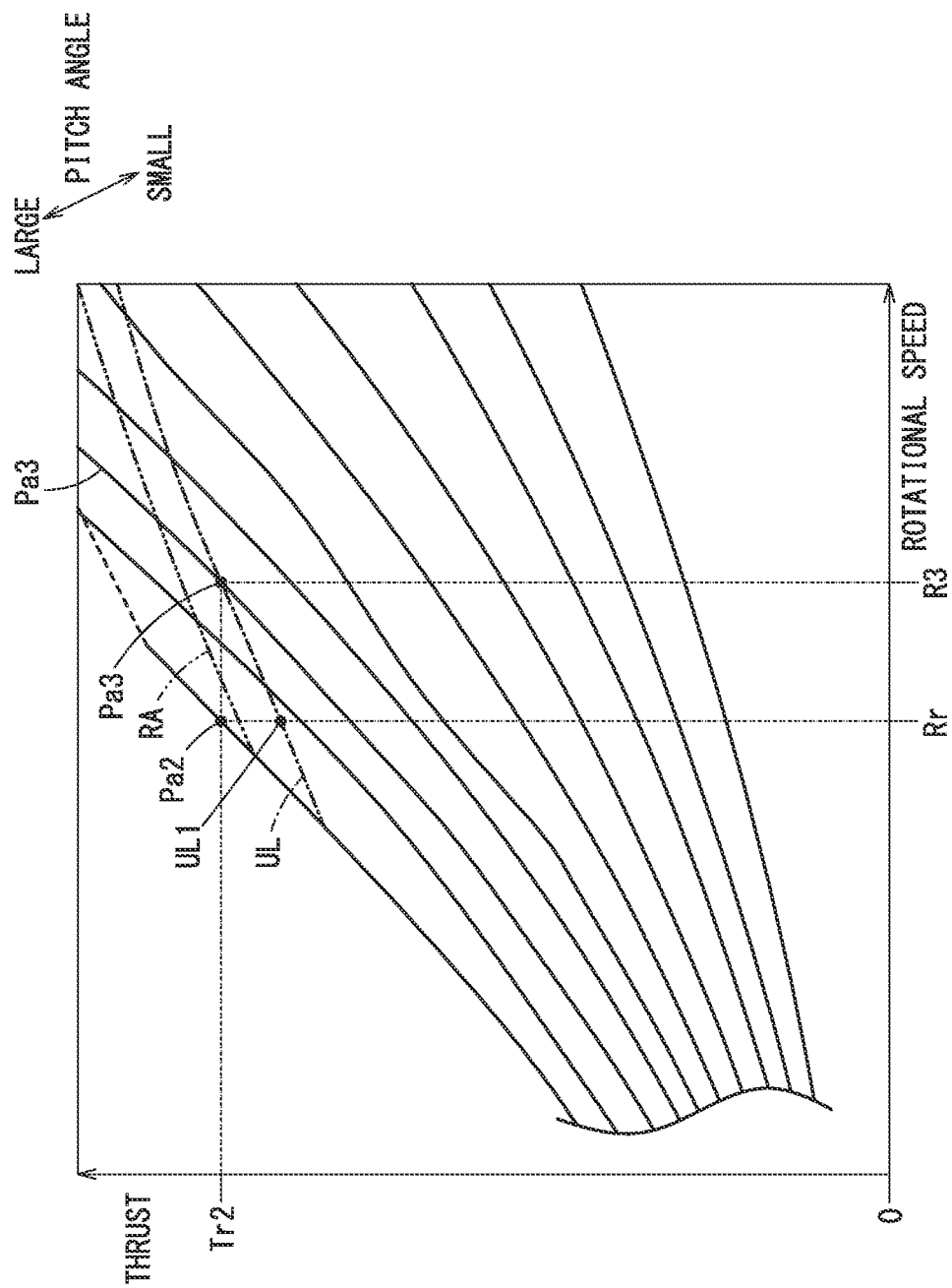
FIG. 6 is a diagram for explaining a method of calculating the pitch angle and the rotational speed.

FIG. 6 is a diagram for explaining a method of calculating the pitch angle and the rotational speed. FIG. 6 is also a diagram for explaining the second control. For example, it is assumed that the pitch angle calculation unit 42 acquires a required thrust value (Tr2) and the reference value (Rr). A pitch angle (Pa2) corresponds to the required thrust value (Tr2) and the reference value (Rr). The pitch angle (Pa2) is greater than the upper limit value (UL1) corresponding to the reference value (Rr). In this case, the pitch angle calculation unit 42 uses the pitch angle calculation map 38 to select a combination of the rotational speed and the pitch angle in which the torque is equal to or less than a predetermined value (in the present embodiment, the torque is equal to or less than the torque corresponding to the upper limit value (UL)), the thrust is equal to the required thrust value (Tr2), and the rotational speed is the minimum. As shown in FIG. 6, the pitch angle calculation unit 42 calculates a pitch angle (Pa3) and a rotational speed (R3).

The control unit 30 switches the thrust control from the first control to the second control when the state shown in FIG. 5 (a first control execution state) is changed to the state shown in FIG. 6 (a second control start state). In the above example, when the required thrust value changes from (Tr1) to (Tr2), the control unit 30 switches the thrust control from the first control to the second control. In this manner, during execution of the first control, when the pitch angle corresponding to both the required thrust value and the reference value exceeds the upper limit value (UL) corresponding to the reference value, the control unit 30 switches the thrust control from the first control to the second control.

Further, the control unit 30 switches the thrust control from the second control to the first control when the state shown in FIG. 6 (a second control execution state) is changed to the state shown in FIG. 5 (a first control start state). That is, when the required thrust value changes from (Tr2) to (Tr1), the control unit 30 switches the thrust control from the second control to the first control. In this manner, during execution of the second control, when the pitch angle corresponding to both the required thrust value and the reference value becomes equal to or less than the upper limit value (UL) corresponding to the reference value, the control unit 30 switches the thrust control from the second control to the first control. The condition for switching from the second control to the first control may be another condition.

According to the first embodiment, the noise can be suppressed by executing the first control. In addition, according to the first embodiment, large thrust can be obtained by executing the second control in response to a large required thrust value. Therefore, according to the first embodiment, it is possible to reduce the occurrence of noise and obtain required thrust.

Further, according to the first embodiment, since the upper limit value (UL) is set for the pitch angle, there is always a margin for the torque of the motor 20. Therefore, according to the first embodiment, it is possible to quickly increase the rotational speed of the propeller 26.

3. Second Embodiment

Figure 7:
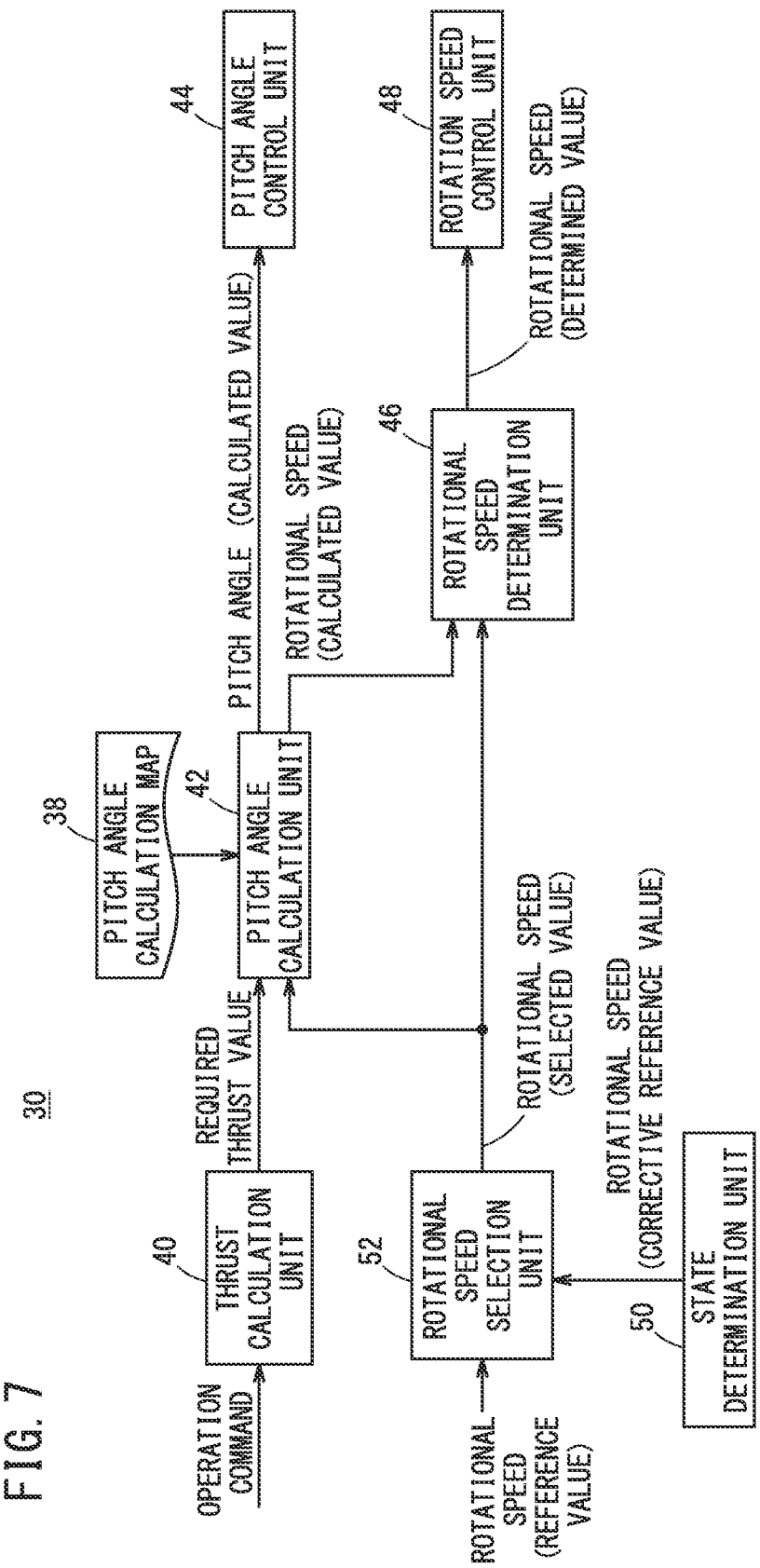
FIG. 7 is a functional block diagram of the control unit in a second embodiment.

FIG. 7 is a functional block diagram of the control unit 30 in a second embodiment. The second embodiment is an application example of the first embodiment. In the second embodiment, the control unit 30 has, in addition to the function in the first embodiment, a function of increasing the rotational speed of the propeller 26 in advance regardless of the required thrust value. In the second embodiment, the same components as those in the first embodiment are denoted by the same reference numerals, and description thereof will be omitted.

The control unit 30 functions as the thrust calculation unit 40, the pitch angle calculation unit 42, the pitch angle control unit 44, the rotational speed determination unit 46, and the rotational speed control unit 48. Further, the control unit 30 functions as a state determination unit 50, and a rotational speed selection unit 52.

The state determination unit 50 determines whether a state where a large thrust is required has occurred. In a case where it is predicted that a large thrust will be required, it is preferable to increase the rotational speed of the propeller 26 in advance. When a large thrust is required, the state determination unit 50 sets a value larger than the reference value. This value is referred to as a corrective reference value. The corrective reference value may be a constant value or a variable value. The variable value may be set for each of the following cases in which a large thrust is required.

For example, in a case where the attitude (yaw, roll, and pitch) of the aircraft greatly changes, it is predicted that a large thrust will be required. The state determination unit 50 monitors the attitude of the aircraft based on the values detected by the sensor group 12. When a yaw change amount per unit time exceeds a predetermined threshold (a change amount threshold), the state determination unit 50 temporarily sets the corrective reference value instead of the reference value. For the roll and the pitch as well, the state determination unit 50 performs processing similar to that performed in the case of the yaw. As a result, necessary thrust can be quickly obtained.

For example, in a case where the speed of the aircraft (airspeed) is greatly reduced, it is predicted that a large thrust will be required. The state determination unit 50 monitors the speed of the aircraft based on the values detected by the sensor group 12. When a deceleration amount per unit time exceeds a predetermined threshold (a change amount threshold), the state determination unit 50 temporarily sets the corrective reference value instead of the reference value. As a result, necessary thrust can be quickly obtained.

For example, in a case where the number of times of switching from the first control to the second control reaches a number-of-times threshold, it is predicted that a large thrust will be required. When the number of times of switching from the first control to the second control within a predetermined time reaches the number-of-times threshold, the state determination unit 50 temporarily sets the corrective reference value instead of the reference value. Thus, it is possible to prevent frequent switching between the first control and the second control in a short period of time.

For example, a pilot may demand a large thrust. In this case, a switch operable by the pilot may be provided in the cockpit. In accordance with the switch operation, the state determination unit 50 temporarily sets the corrective reference value instead of the reference value.

The rotational speed selection unit 52 acquires the reference value of the rotational speed of the propeller 26 from the storage unit 32, and acquires the corrective reference value from the state determination unit 50. The rotational speed selection unit 52 selects the larger one of the reference value and the corrective reference value, as a selected value. For example, the state determination unit 50 does not set the corrective reference value in a state where a large thrust is not required. In this case, the rotational speed selection unit 52 sets the reference value as the selected value. On the other hand, in a state where a large thrust is required, the state determination unit 50 sets the corrective reference value. In this case, the rotational speed selection unit 52 sets the corrective reference value as the selected value.

The pitch angle calculation unit 42 and the rotational speed determination unit 46 of the first embodiment acquire the reference value from the storage unit 32. On the other hand, the pitch angle calculation unit 42 and the rotational speed determination unit 46 of the second embodiment acquire the selected value from the rotational speed selection unit 52. Except for this feature, the subsequent processing of the second embodiment is the same as that of the first embodiment.

In the second embodiment, when a state where a large thrust is required occurs, the state determination unit 50 sets the corrective reference value larger than the reference value. As a result, the rotational speed of the propeller 26 increases. That is, in the second embodiment, the control unit 30 switches the thrust control from the first control to the second control when a state where a large thrust is required occurs.

According to the second embodiment, the same effect as that of the first embodiment can be obtained.

4. Invention Obtained from Embodiments

The invention that can be grasped from the above embodiments will be described below.

According to an aspect of the present invention, provided is the thrust generating device (10) including: the propeller (26) including one or a plurality of blades (28) and configured to generate thrust in the vertical direction for the aircraft; the motor (20) configured to rotate the propeller; the actuator (22) configured to change the pitch angle of each of the blades; and the controller (14) configured to control the rotational speed of the propeller by controlling the motor, and to control the pitch angle of each of the blades by controlling the actuator, wherein the controller executes one of the first control of controlling the thrust by changing the pitch angle of each of the blades while maintaining the rotational speed of the propeller at the reference value, or the second control of allowing the thrust greater than the thrust generated in the first control to be generated by making the rotational speed of the propeller larger than the reference value.

According to the above configuration, it is possible to reduce the occurrence of noise and obtain required thrust.

In the above aspect, when a predetermined condition is satisfied during execution of the first control, the controller may switch from the first control to the second control and execute the second control.

In the above aspect, when the pitch angle exceeds the predetermined upper limit value (UL), the controller may switch from the first control to the second control and execute the second control.

According to the above configuration, it is possible to further reduce the occurrence of noise.

In the above aspect, the pitch angle at which the torque of the motor is smaller than the rated value (RA) may be set as the upper limit value.

According to the above configuration, it is possible to prevent the responsiveness of the propeller from deteriorating.

In the above aspect, when the required thrust value falls below a required thrust threshold after the first control is switched to the second control, the controller may switch from the second control to the first control and execute the first control.

In the above aspect, when the number of times of switching from the first control to the second control reaches the predetermined number-of-times threshold, the controller may maintain the second control regardless of the required thrust value.

According to the above configuration, it is possible to prevent frequent switching between the first control and the second control in a short period of time.

In the above aspect, the controller may monitor the attitude change amount of the aircraft or the speed change amount of the aircraft, and when the attitude change amount or the speed change amount exceeds a predetermined change amount threshold, the controller may switch from the first control to the second control and execute the second control.

According to the above configuration, it is possible to quickly obtain necessary thrust.

Note that the present invention is not limited to the above disclosure, and various modifications are possible without departing from the essence and gist of the present invention.

The invention claimed is:

1. A thrust generating device comprising:
a propeller including a plurality of blades and configured to generate thrust in a vertical direction for an aircraft;
a motor configured to rotate the propeller;
an actuator configured to change a pitch angle of each of the blades; and
a controller configured to control a rotational speed of the propeller by controlling the motor, and to control the pitch angle of each of the blades by controlling the actuator,
wherein
the controller executes one of a first control of controlling the thrust by changing the pitch angle of each of the blades while maintaining the rotational speed of the propeller at a reference value, or a second control of allowing the thrust greater than the thrust generated in the first control to be generated by making the rotational speed of the propeller larger than the reference value, and
when the pitch angle exceeds a predetermined upper limit value, the controller switches from the first control to the second control and executes the second control.

2. The thrust generating device according to claim 1, wherein
the pitch angle at which a torque of the motor is smaller than a rated value is set as the predetermined upper limit value.

3. The thrust generating device according to claim 1, wherein
when a required thrust value falls below a predetermined required thrust threshold after the first control is switched to the second control, the controller switches from the second control to the first control and executes the first control.

4. The thrust generating device according to claim 3, wherein
when a number of times of switching from the first control to the second control reaches a predetermined number-of-times threshold, the controller maintains the second control regardless of the required thrust value.

5. The thrust generating device according to claim 1, wherein
the controller monitors an attitude change amount of the aircraft or a speed change amount of the aircraft, and when the attitude change amount or the speed change amount exceeds a predetermined change amount threshold, the controller switches from the first control to the second control and executes the second control.

* * * * *